(No Model.)
A. E. COOK.
VEHICLE SPRING.
No. 401,818. Patented Apr. 23, 1889.
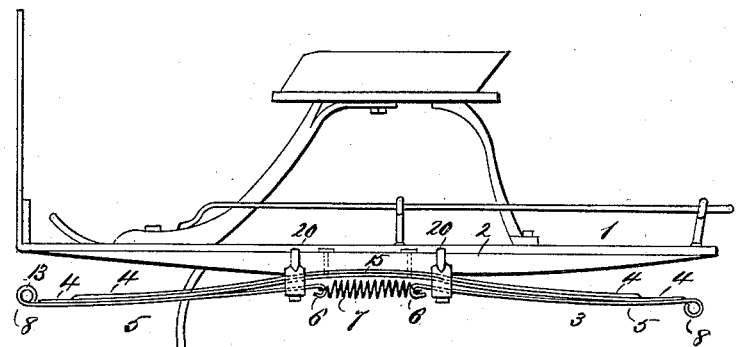
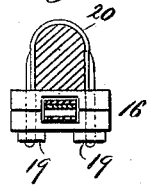
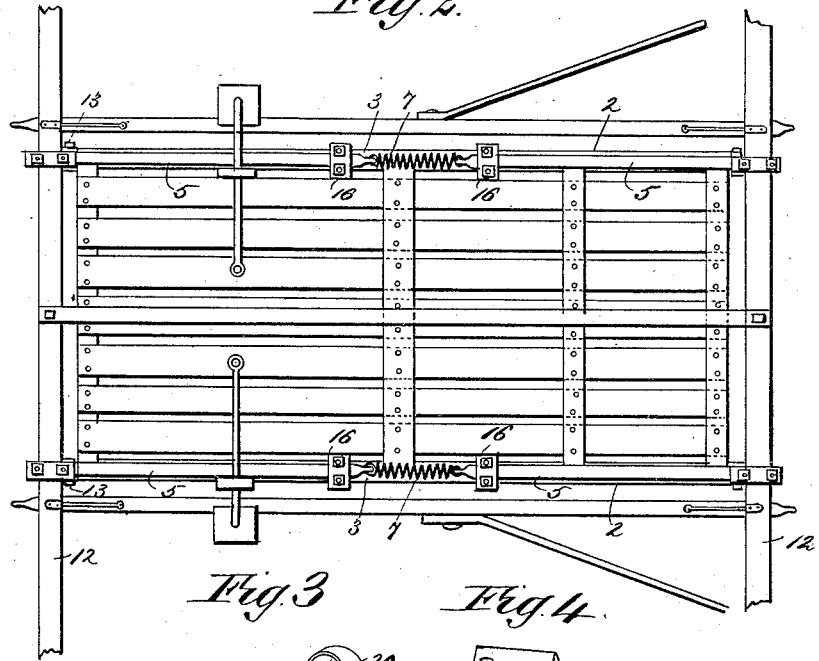
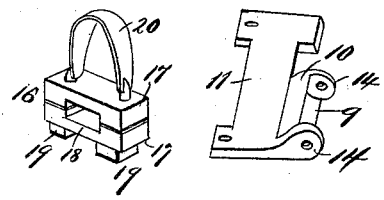
WITNESSES:
F. McArdle
C. Sedgwick
INVENTOR:
A. E. Cook
BY Munn & Co.
ATTORNEYS.

UNITED STATES PATENT OFFICE.

ALBERT E. COOK, OF KNOWLTON, QUEBEC, CANADA, ASSIGNOR TO GEORGE W. VANCOR, OF SAME PLACE.

VEHICLE-SPRING.

SPECIFICATION forming part of Letters Patent No. 401,818, dated April 23, 1889.

Application filed December 1, 1888. Serial No. 292,381. (No model.)

*To all whom it may concern:*

Be it known that I, ALBERT E. COOK, of Knowlton, in the Province of Quebec and Dominion of Canada, have invented a new and Improved Vehicle-Spring, of which the following is a full, clear, and exact description.

This invention relates to vehicle-springs, and has for its object to provide a vehicle-spring by means of which in the working of the spring the slack thereof will be automatically regulated and an extended bearing for the spring provided.

The invention consists in a vehicle-spring and in details thereof, constructed and arranged as hereinafter described and claimed.

Reference is to be had to the accompanying drawings, forming a part thereof, in which similar figures of reference indicate corresponding parts in all the views.

Figure 1 is a side view of a vehicle-body, showing invention attached. Fig. 2 is a plan view looking at the under side thereof. Fig. 3 is a detail of one of the spring-clips. Fig. 4 is a detail of one of the socket-plates for connecting one end of the spring to an axle; and Fig. 5 is a detail of one of the spring-clips attached to the spring, the bearing-bar being shown in cross-section.

1 indicates a vehicle-body, having bolted to its sides the longitudinal bars 2, formed in the shape of rockers, and serving as bearings for the longitudinal springs 3. The latter are constructed with the usual flat plate-spring leaves, 4, and two short bottom flat plate-spring leaves, 5, having their inner ends formed with hooks 6, connected together by a suitable spring, and, as here shown, preferably by a coiled spring, 7, giving a longitudinal tension to the leaves 5. The outer ends of the leaves 5 are formed with an eye, 8, which has a rocking bearing in a circular recess, 9, of the lug 10, projecting from a plate, 11, bolted to axle 12, and is secured to lug 10 by a pin or bolt, 13, projecting through the perforated ears 14 of lug 10 and through the eye 8.

The springs 3 normally support the bars 2 on their central upwardly-curved portion, 15, and rest in a correspondingly-shaped recess in the bars 2. Upon weight being applied to the body 1 the bearing on springs 3 of the bars 2 will be lengthened or shortened according to the downward pressure and rocking movement of the body 1, the curved or rocker form of the bars 2 affording an extended bearing on the springs 3.

To hold the leaves 5 in position relatively to the leaves 4 they are extended through blocks 16, preferably formed in two parts, 17, having opposing recesses forming a passage-way, 18, through which the leaves 4 and leaves 5 extend, and secured by nuts 19 to a clip, 20, mounted on the bars 2.

By means of this invention it will be seen that a strong, effective, and durable vehicle-spring is provided in which the lengthwise tension of the spring is automatically regulated, the slack of the spring taken up, and an extended bearing afforded, and the strain is removed from the bottom of the spring and buckles are dispensed with.

Having thus described my invention, I claim as new and desire to secure by Letters Patent—

1. A vehicle-spring having its lower leaf formed in two parts, with a spring connecting the inner ends, substantially as described.

2. A vehicle-spring having its lower leaf formed in two parts, with their inner ends connected by a spring having longitudinal endwise tension, substantially as described.

3. In a vehicle-spring, the combination, with a rocker-shaped bearing, of a vehicle-spring having its lower leaf formed in two parts, with their inner ends connected by a spring, substantially as described.

4. In a vehicle-spring, the combination, with a rocker-shaped bearing having clips with blocks formed with passage-ways, of a vehicle-spring extending through the passage-ways, and having its lower leaf formed in two parts connected at their inner ends by a spring, substantially as described.

5. A vehicle-spring, 3, formed of the leaves 4 and the bottom short leaves, 5, having their inner ends connected by a coiled spring, 7, substantially as described.

6. The combination, with rocker-shaped bearing-bar 2, having clips 20, with blocks 16, having passage-way 18, of the spring 3, extending through passage-way 18 and formed of the leaves 4 and the bottom short leaves, 5, connected at their inner ends by coiled spring 7, substantially as described.

ALBERT E. COOK.

Witnesses:
W. F. ROBB,
W. L. LUSON.